(12) United States Patent
Brima et al.

(10) Patent No.: US 6,812,273 B1
(45) Date of Patent: Nov. 2, 2004

(54) MANUFACTURING INORGANIC POLYMER HYBRIDS

(75) Inventors: Thomas S. Brima, deceased, late of Pittsburgh, PA (US); by Gwendolyn Hawk, legal representative, Pittsburgh, PA (US); Masaki Fujii, Sewickley, PA (US); Seyhun Kim, Murrysville, PA (US); George R. Gallaher, Jr., Oakmont, PA (US); Edwin B. Townsend, IV, New Kensington, PA (US); Kimberly M. McLoughlin, Gibsonia, PA (US)

(73) Assignee: Sunoco, Inc., Philadephia, PA (US)

( * ) Notice: Subject to any disclaimer, the term of this patent is extended or adjusted under 35 U.S.C. 154(b) by 216 days.

(21) Appl. No.: 10/043,934

(22) Filed: Jan. 11, 2002

(51) Int. Cl.$^7$ ................................................ C08K 3/34
(52) U.S. Cl. ...................... 524/450; 524/447; 524/448; 524/449
(58) Field of Search ................................ 524/447, 445, 524/186, 450, 448

(56) References Cited

U.S. PATENT DOCUMENTS

| 4,810,734 | A | * | 3/1989 | Kawasumi et al. ......... 523/216 |
| 5,760,121 | A | * | 6/1998 | Beall et al. .................. 524/450 |
| 5,973,053 | A | | 10/1999 | Usuki et al. |
| 6,034,164 | A | * | 3/2000 | Elspass et al. ............... 524/445 |
| 6,617,020 | B2 | * | 9/2003 | Zhou et al. ............. 428/355 R |

FOREIGN PATENT DOCUMENTS

EP  0 807 659  * 5/1997

EP  0 807 659 A1  * 11/1997  ............ C08K/3/34

OTHER PUBLICATIONS

Oya, et al., Factors controlling mechanical properties of clay mineral/polypropylene nanocomposites, 35 Journal of Materials Science 1045–1050 (2000).

Reichert, et al., Poly(propylene)/organoclay nanocomposite formation: Influence of compatibilizer functionality and organoclay modification, 275 Macromol. Mater. Eng. 8–17 (2000).

Kawasumi, et al., Preparation and Mechanical Properties of Polypropylene–Clay Hybrids, 30 Macromolecules 6333–6338 (1997).

Hasegawa, et al., Preparation and Mechanical Properties of Polystyrene–Clay Hybrids, 74 Journal of Applied Polymer Science 3359–3364 (1999).

Zhang, et al., Effect of Quarternary Ammonium–Modified Montmorillonites on Mechanical Properties of Polypropylene, 520 Mat. Res. Soc. Symp. Proc. 191–195 (1998).

* cited by examiner

*Primary Examiner*—Katarzyna Wyrozebski-Lee
(74) *Attorney, Agent, or Firm*—Buchanan Ingersoll PC; Robert A. Koons, Jr., Esq.; Gary Mangels

(57) ABSTRACT

Method of manufacturing inorganic polymer hybrids with improved mechanical properties and even dispersion of the inorganic material in the hybrids. Nanoscale exfoliation of inorganic materials having layered structures is induced, and said inorganic materials are combined with an emulsion comprising one or more molten polymers. The method provides nanoscale dispersion of inorganic material throughout the emulsion of one or more polymers without the use of compatibilizers.

22 Claims, 2 Drawing Sheets

MANUFACTURING INORGANIC POLYMER HYBRIDS

FIELD OF THE INVENTION

This invention relates in general to methods of producing inorganic polymer hybrids. More specifically, this invention relates to methods of producing inorganic polymer hybrids by inducing nanoscale exfoliation of an inorganic component.

BACKGROUND OF THE INVENTION

Hybrid composites of polymer and inorganic components such as clays and mica have been described in the prior art as having improved mechanical properties. Such composites are referred to as nanocomposites, which reflects the dispersion of nano-scale particulates of the inorganic component of the hybrid in the polymer matrix. There are references in both the patent and scientific literature of various clays, which have been modified and combined with polar polymers such as polyamides to form nanocomposite materials.

However, the introduction of nanoparticles into nonpolar polymers such as polyolefins to form a nanocomposite is a much more difficult task due to incompatibility of the polar nano particles with the nonpolar polymer. This incompatibility often causes non-uniform distribution of the inorganic component throughout the polymer, leading to less than optimum performance. Typically, this difficulty is overcome by combining the nonpolar polymer with a similar, but chemically modified polymer (e.g. polypropylene-g-MA), which contains polar functionality to act as a compatibilizer molecule. The polar functionality of the modified polypropylene is able to interact with the polar character of the nanoparticle, and the nonpolar portion of the modified polypropylene interacts with the polypropylene matrix. Presumably, the interaction between the two polar functionalities provides both exfoliation and compatiblization, thereby resulting in a nanocomposite with uniform distribution of the nanoparticles.

U.S. Pat. No. 5,973,053 describes a layered composite clay material wherein organic onium ions and primary and secondary organic "guest" molecules are introduced into the interlayer space to increase the interlayer distance. The introduction of the organic onium ion acts to increase the compatibility of the clay with polymer and facilitate the dispersion of the clay in the hybrid composite.

In "Factors Controlling Mechanical Properties of Clay Mineral/Polypropylene nanocomposites", *Journal of Materials Sciences* 35 (2000) 1045–1050, Oya et al describe intercalating a clay with a polar monomer, diacetone acrylamide and maleic acid modified polypropylene as a compatibilizer. This organo-clay was then mixed with conventional polypropylene to prepare a nanocomposite. In "Poly (propylene)/organoclay nanocomposite formation: Influence of compatibilizer functionality and organoclay modification", *Macromolecular Material Engineering* 275, 8–17 (2000), Reichert et al describe the use of alkyl amines as intercalating agents in silica clay with and without the use of maleic anhydride modified polypropylene.

It would be desirable to provide a method for making a nanocomposite with uniform dispersion of the inorganic component that does not require the use of compatibilizers. It would still further be desirable to provide a method for making inorganic polymer hybrids using hydrotalcites that are self- and/or reversibly exfoliating such that the hydrotalcites could be produced and stored for later use. It would still further be desirable to provide hydrotalcite polymer nanocomposites with improved mechanical properties and method for producing them using modified or unmodified hydrotalcites.

SUMMARY

The present invention provides a method for producing inorganic polymer hybrids with improved mechanical properties and even dispersion of the inorganic material in the hybrids. The method provides for inducing exfoliation in an inorganic material having a layered structure, and combining said exfoliated inorganic material with an emulsion comprising at least one molten polymer. The method of the current invention takes advantage of the interaction between jag inorganic materials and solvent molecules that are introduced into, or associated within the layers of the inorganic material to induce exfoliation of the inorganic material.

In one embodiment of the present invention, the inorganic material is added to a solvent to create a suspension, slurry, or paste. In this embodiment, self-exfoliation occurs in the solvent, and the resulting suspension, slurry, or paste is then combined with the molten polymer to create an inorganic polymer hybrid.

In another embodiment of the present invention, exfoliation of the inorganic material is induced by rapid vaporization of solvent molecules trapped in or associated with the layers of the inorganic material when the dry inorganic material is combined with the molten polymer to create an inorganic polymer hybrid.

DETAILED DESCRIPTION OF THE INVENTION

Figure 1:
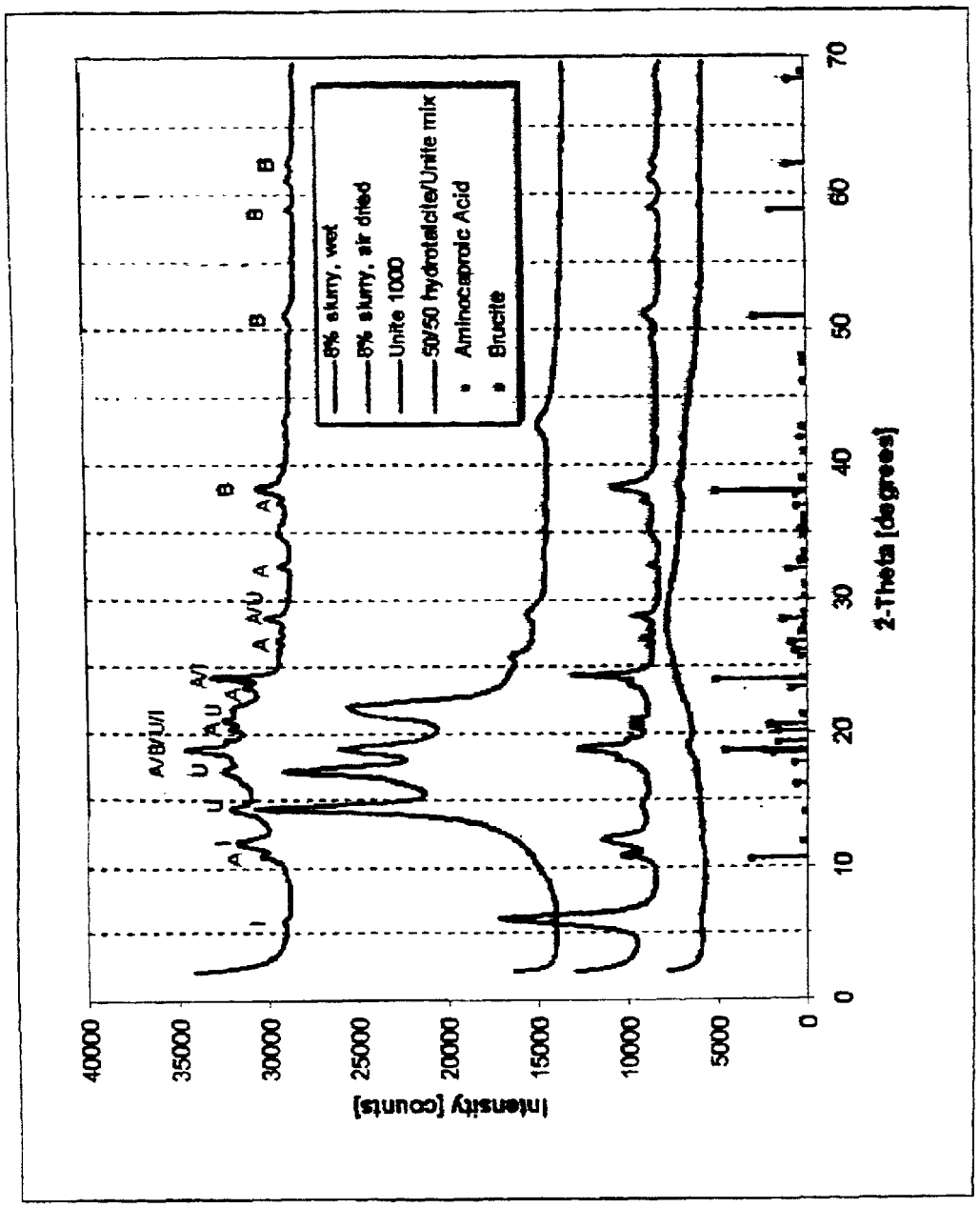
FIG. 1 is a graph of x-ray diffraction ("XRD") scans of samples tested for exfoliation.

The present invention provides a method for producing inorganic polymer hybrids. The method provides for exfoliating an inorganic material having a layered structure and combining the exfoliated inorganic material with an emulsion comprising at least one molten polymer.

According to one aspect of the present invention, an inorganic material having a layered structure is provided. Any suitable inorganic material having a layered structure can be employed. Preferred inorganic materials include natural and synthetic hydrotalcites, clays and micas.

According to another aspect of the present invention, an emulsion comprising at least one molten polymer is provided. Polymers that are useful in the creation of inorganic polymer hybrids include, but are not limited to: thermoplastics, thermoset and rubber, and more specifically, polypropylene, impact polypropylene, random polypropylene, polyethylene, polybutadiene, polystyrene, high impact polystyrene, styrene acrylonitrile, acrylonitrile-butadiene-styrene, polyethylene terephthalate, polybutadiene terephthalate, styrene butadiene rubber, butyl rubber, nitrobutyl rubber, dynamically cross-linked thermoplastic olefin polymers, polyurethane, nylon, and polycarbonate. Polymers suitable for this invention can also include acid or ester functionalized polymers. Compatibilizers commonly used with non-polar polymers are maleic acid and glycidyl methacrylate.

According to another aspect of the present invention, the exfoliated inorganic material is combined with the molten polymer by any method sufficient to combine the exfoliated inorganic material with the molten polymer. Preferably, the method used to combine the exfoliated inorganic material and molten polymer is an extruder. However, it is recognized that other means for combining the exfoliated inorganic material with the molten polymer may be contemplated in this invention.

This invention takes advantage of the interaction between inorganic materials and solvent molecules that are introduced into, or associated within the layers of the inorganic material to induce nanoscale exfoliation of the inorganic material. According to one embodiment of the present invention, nanoscale exfoliation of the inorganic material is induced by adding the inorganic material to a solvent to form a suspension, slurry or paste. Inorganic materials useful according to this embodiment of the present invention are those that are capable of self and/or reversible exfoliation. Preferably, the inorganic material is a synthetic intercalated hydrotalcite. More preferably, the inorganic material is an amino-acid intercalated hydrotalcite. Amino-acids that may be used according to this embodiment of the invention include straight chain amino-acids, branched chain amino-acids, saturated amino-acids, unsaturated amino-acids and substituted amino-acids. More preferably, the amino-acids are aminobutyric acid or aminocaproic acid. Preferably, solvents used in this embodiment are water, alcohols such as methanol, ethanol, n-propanol, i-propanol, n-butanol, and i-butanol, or ketones such as acetone and methyl ethyl ketone. More preferably, the solvent is water. According to a preferred embodiment of the present invention, nanoscale exfoliation is induced in an amino-acid intercalated hydrotalcite when it is added to a solvent to form a suspension, slurry or paste. The suspension, slurry or paste is combined with an acid-modified molten polymer using an extruder. While not wishing to be bound by theory, it is postulated that the amine group on the amino-acid, which remains in the spaces within the layers of the hydrotalcite (the "galleries"), is very reactive and reacts with the acid functional group on the modified polypropylene to create an amide or imide. The formation of the amide or imide group leads to direct chemical linkage between the exfoliated hydrotalcite platelets and the molten polymer, reinforcing the interface between the exfoliated hydrotalcite platelets and the polymer matrix and improving physical properties of the eventually molded articles. Nanocomposites manufactured according to this embodiment of the present invention contain from 2% to 10% of the amino-acid intercalated hydrotalcite by weight, preferably from 3% to 8%, and more preferably from 4% to 6%.

According to another embodiment of the present invention, nanoscale exfoliation is induced by rapid vaporization of the solvent molecules trapped within, or associated with the layers of an inorganic material by adding the dry inorganic material to an emulsion of at least one molten polymer. Inorganic materials useful according to this embodiment of the present invention are hydrotalcites, clays, and micas that have solvent molecules trapped in or associated within the layers of the inorganic material. Preferably, the inorganic material is a synthetic hydrotalcite. In one embodiment, the dry inorganic material is combined with the molten polymer using an extruder. While not wishing to be bound by theory, it is postulated that the rapid vaporization of solvent molecules trapped in or associated within the layers of the inorganic material creates internal pressure that separates the layers, or "platelets" of the inorganic material when the dry inorganic material is combined with the molten polymer. Mixing of the inorganic material and the molten polymer must be sufficient to maintain nanoscale exfoliation of the inorganic material.

In another embodiment of the present invention, an inorganic material is combined with a modified polymer to create a "master-batch" of the inorganic material/modified polymer. The "master-batch" is then combined with a molten polymer to create a nanocomposite. Preferably, the inorganic material is an intercalated hydrotalcite. More preferably, the inorganic material is an amino-acid intercalated hydrotalcite. The "master-batch" is combined with an emulsion comprising at least one molten polymer to create the inorganic polymer hybrid. Preferably, a "master-batch" of inorganic material/modified polymer contains from 20% to 80% of the inorganic material by weight, and more preferably from 30% to 60%

The method of the present invention provides several advantages over the prior methods of manufacturing nanocomposites of inorganic materials and polymers. The method eliminates the need for a compatibilizer as a third component in the manufacture of nanocomposites, as the inorganic material is either self-exfoliated or exfoliated by rapid vaporization. The exfoliated inorganic material may then be combined with and evenly distributed throughout an emulsion of at least one molten polymer. Although the invention does not require the use of compatibilizers, the use of non-polar polymers modified with compatibilizers also contributes to exfoliation of the inorganic material such that the exfoliated material may be combined with and evenly distributed throughout the molten polymer. Nanocomposites using the method of invention also have greatly improved mechanical properties including, but not limited to: flexural modulus, tensile strength, impact, barrier properties and flame retardancy. Nanocomposites formed using an amino-acid hydrotalcite and causing self-exfoliation in a solvent may contain only 10% by weight of amino-acid intercalated hydrotalcite but have properties that are equal to or superior to other nanocomposites having 20% by weight of other fillers.

EXAMPLE 1

Preparation and Analysis of a 50/50 Maleated Polypropylene/Amino-Acid Intercalated Hydrotalcite Mix 10 g of UNTM 1000® maleated polypropylene ("maleated PP") by Aristech was added to 166.7 g of nominally 6 wt % 6-aminocaproic acid-based hydrotalcite ("HT") slurry in a 600 ml metal beaker in a heating jacket to create a 50/50 UNITE/HT mixed material. Mixing was performed using a high speed (8000 revolutions per minute maximum) Gifford-Wood homo-mixer plugged into a variable transformer to allow adjustments to the mixing speed. The mixture was then heated while being stirred. Mixing/heating were continued until the mixture thickened into a thick, pasty material. This material was then removed from the beaker and allowed to air dry. A portion of this air-dried material was ground for XRD analysis.

XRD analysis was performed on the dried 50/50 material, as well as on wet and air-dried 8 wt % HT slurry samples, and a dried ground sample of UNTIE 1000.

Referring now to FIG. 1, the results of the XRD scans are presented. FIG. 1 shows from bottom to top XRD scans of the 8 wt % wet HT slurry, an air-dried sample from the 8 wt % HT slurry, a UNITE 1000 sample, and a sample of the 50/50 mix. The XRD scan indicates the presence or absence of a basal peak in the region of approximately 6° on the $2\theta$ axis for several samples tested. The presence of a strong basal peak in this region indicates an unexfoliated state. A smaller peak indicates an increased state of nanoscale exfoliation, and the absence of a peak indicates complete nanoscale exfoliation, and a true nanocomposite. The scan of the 8 wt % wet HT slurry shows no peak at the 6° region, indicating a completely exfoliated state. Conversely, the scan of the air-dried sample of the 8 wt % HT slurry shows a significant peak, indicating an unexfoliated state. The third scan from the bottom, the UNITE 1000 sample, shows a slight peak. Lastly, the 50/50 mix is almost completely exfoliated, with a slight peak at 6° indicating the presence of the UNITE 1000 in the nanocomposite.

Figure 2:
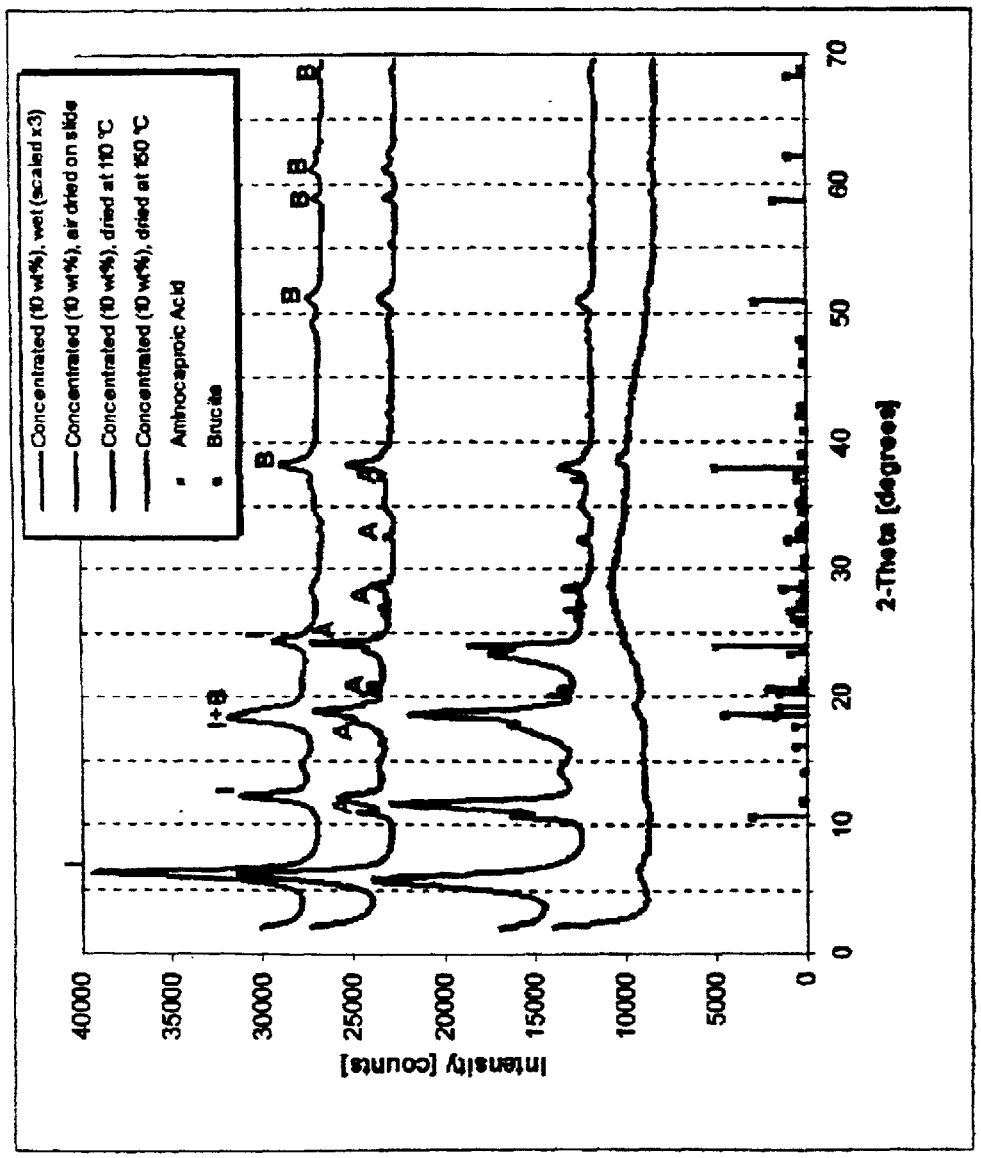
FIG. 2 is a graph of XRD scans of pure hydrotalcite samples, tested at different temperatures while heating.

Referring now to FIG. 2, XRD scans were performed on samples of 10 wt % slurry of HT wet, 10 wt % slurry air dried, 10 wt % slurry dried at 100° C., and 10 wt % slurry dried at 150° C. As shown in FIG. 2, in the air-dried sample, peaks of 6-aminocaproic acid appear in the region of about 12° to about 37°. The scans of the slurry dried at 100 and 150 show that the aminocaproic acid peaks diminish and the 60 basal peak continues to sharpen with heating until the HT structure is destroyed.

Comparing FIGS. 1 and 2, heating of the 10 wt % HT slurry destroyed the HT structure, as indicated in FIG. 2 by the decreased aminocaproic acid peaks and increased basal peak, but mixing in a heated jacket to create the 50/50 UNITE/HT mixture forms a true nanocomposite, as indicated by the presence of small aminocaproic acid peaks and the absence of a basal peak at the 6° position on FIG. 1.

EXAMPLE 2

Preparation and Analysis of Polymer/Clay Nanocomposites Using Clays in Powder and Paste Form A commercial grade clay, Cloisite 15A, was obtained from Southern Clay. The clay is natural sodium montmorillonite that has been modified with dimethyl dihydrogenated tallow ammonium. The ammonium cation is expected to attach to the anionic surface of the clay platelets. The organic (tallow) portion of the ammonium modifier is expected to promote adhesion of the clay to the polypropylene ("PP") matrix. The clay was used either in a dry powdery state as received or in the state of moistened doughy crumbs. It is expected that the moistened crumbs contain water molecules inside the clay's layered structure (or trapped in the galleries) as well as outside the galleries (or the bulk water).

In a set of experiments, A1 and B1, the powdery Cloisite 15A clay was extruded with an injection-molding grade polypropylene homopolymer (D-115A; Aristech Chemical) and a 200-MFI maleated polypropylene ("mPP") that contains 0.7 weight percent maleic anhydride (Unite MP-880; Aristech Chemical). In another set of experiments, A2 and B2, the clay in the state of moistened doughy crumbs was used in the same formulation as in the first set of the experiments. In the third set of experiments (C1 and C2), Cloisite NA+clay was used in a similar manner as in other sets of experiments. This clay was natural montmorillonite clay without modification with organic ammonium, and was obtained from Southern Clay.

Other than these 3 sets of experiments, a control experiment was run with injection-molding grade PP homopolymer (D-115A; Aristech Chemical) under the same conditions except that neither mPP nor clay was added.

The PP and mPP were dry-blended, then the polymer blends and the clay were fed simultaneously to the feed throat of the ZSK-30 co-rotating twin-screw extruder at the PPTC. In the downstream of the extruder, a vacuum vent nozzle was equipped for devolatilization when the clay was used in a moistened state. The extruder barrel temperature in the zone nearest the feed throat was set to 270° C. to rapidly melt the PP. Barrel temperatures were set to values that decreased systematically toward the die. The die temperature was set to 160–170° C. The goal was to cool the material as it progressed along the barrel, steadily increasing the melt viscosity and thereby inducing shear. The high shear induced by cooling was expected to aid exfoliation and dispersion of clay platelets in the PP matrix.

Extruder screw speed was set at 400 rpm. The polymer/clay nanocomposites created are detailed on TABLE 1. After extrusion, the samples were cooled in a water bath, dried by an air knife, and pelletized.

The polymer/clay composites were submitted for mechanical testing as an assessment of exfoliation. Effective exfoliation and dispersion of clay platelets in a polymer matrix is expected to result in significant increases in heat distortion temperature and flexural modulus. Data are shown in TABLE 1. The key properties of flexural modulus and distortion temperature under load ("DTUL") were enhanced through the use of moistened clay. Exfoliation of the clay platelets was promoted by the rapid evaporation of the trapped water molecules in the galleries.

The foregoing illustrates of embodiments of the present invention are offered for the purposes of illustrations and not limitation. It will be readily apparent to those skilled in the art that the embodiment described herein may be modified or revised in various ways without departing from the spirit and scope of the invention. The scope of the invention is to be measured by the appended claims.

What is claimed is:

1. A method of making a nanocomposite, said method comprising:

providing an amino acid intercalated hydrotalcite having a layered structure when in a dry state;

providing an emulsion of at least one molten polymer; and combining said amino acid intercalated hydrotalcite in a dry state with said emulsion comprising at least one molten polymer to make said nanocomposite such that nanoscale exfoliation of said amino acid intercalated hydrotalcite is established and maintained.

2. The method of claim 1, wherein said amino-acid is aminobutyric acid.

3. The method of claim 1, wherein said amino-acid is aminocaproic acid.

4. The method of claim 1, wherein said step of combining is accomplished by an extruder.

5. The method of claim 1, wherein said polymer is selected from polypropylene, polyethylene, polybutadiene, polystyrene, high impact polystyrene, styrene acrylonitrile, acrylonitrile-butadienestyrene, polyethylene terephthalate, polybutylene terephthalate, styrene butadiene rubber, butyl rubber, nitrobutyl rubber, polycarbonate, dynamically cross-linked thermoplastic olefin polymers, polyurethane and polyamides.

6. The method of claim 1, wherein said polymer is polypropylene.

7. The method of claim 6, wherein said polypropylene is a modified polypropylene.

8. The method of claim 7, wherein said modified polypropylene is a maleated polypropylene.

9. The method of claim 7, wherein said modified polypropylene is modified with glycidyl methacrylate.

10. A method of making a nanocomposite, said method comprising:

providing an amino acid intercalated hydrotalcite, said amino acid intercalated hydrotalcite having a layered structure when in a dry state;

adding said amino acid intercalated hydrotalcite to a solvent to form a suspension, slurry or paste to induce exfoliation of said amino acid intercalated hydrotalcite;

providing an emulsion of at least one molten polymer, and combining said exfoliated amino acid intercalated hydrotalcite with said emulsion comprising at least one molten polymer to make said nanocomposite such that nanoscale exfoliation of said exfoliated amino acid intercalated hydrotalcite is maintained.

11. The method of claim 10, wherein said solvent is water.

12. The method of claim 10, wherein said solvent is an alcohol.

13. The method of claim 12, wherein said alcohol is selected from methanol, ethanol, n-propanol, i-propanol, n-butanol, i-butanol.

14. The method of claim 10, wherein said solvent is a ketone selected from acetone or methyl ethyl ketone.

15. The method of claim 10, wherein said step of combining is accomplished by an extruder.

16. The method of claim 10, wherein said amino-acid is aminobutyric acid.

17. The method of claim 10, wherein said amino-acid is aminocaproic acid.

18. The method of claim 10, wherein said polymer is selected from polypropylene, polyethylene, polybutadiene, polystyrene, high impact polystyrene, styrene acrylonitrile, acrylonitrile-butadienestyrene, polyethylene terephthalate, polybutylene terephthalate, styrene butadiene rubber, butyl rubber, nitrobutyl rubber, polycarbonate, dynamically cross-linked thermoplastic olefin polymers, polyurethane and polyamides.

19. The method of claim 10, wherein said polymer is polypropylene.

20. The method of claim 19, wherein said polypropylene is a modified polypropylene.

21. The method of claim 20, wherein said modified polypropylene is a maleated polypropylene.

22. The method of claim 20, wherein said modified polypropylene is modified with glycidyl methacrylate.

* * * * *